United States Patent
Luo et al.

(10) Patent No.: US 11,807,538 B1
(45) Date of Patent: Nov. 7, 2023

(54) METHOD FOR REMOVING PHOSPHORUS AND BORON IMPURITY FROM INDUSTRIAL SILICON MELT BY SECONDARY REFINING

(71) Applicant: Chengdu University of Technology, Chengdu (CN)

(72) Inventors: Dawei Luo, Chengdu (CN); Ke Rong, Chengdu (CN); Zijie Gao, Chengdu (CN); Jiabao Deng, Chengdu (CN)

(73) Assignee: CHENGDU UNIVERSITY OF TECHNOLOGY, Chengdu (CN)

( * ) Notice: Subject to any disclaimer, the term of this patent is extended or adjusted under 35 U.S.C. 154(b) by 0 days.

(21) Appl. No.: 18/140,647

(22) Filed: Apr. 28, 2023

(30) Foreign Application Priority Data

Apr. 29, 2022 (CN) .......................... 202210463712.1

(51) Int. Cl.
  *C01B 33/037* (2006.01)
  *C22B 9/05* (2006.01)
  *C01B 33/02* (2006.01)

(52) U.S. Cl.
  CPC ............ *C01B 33/037* (2013.01); *C01B 33/02* (2013.01); *C22B 9/05* (2013.01); *C01P 2006/80* (2013.01)

(58) Field of Classification Search
  None
  See application file for complete search history.

(56) References Cited

U.S. PATENT DOCUMENTS 4,200,621 A * 4/1980 Liaw ....................... C30B 15/00
                                                      156/64

FOREIGN PATENT DOCUMENTS

CN      105329901 A      2/2016
JP      2004010472 A  *  1/2004

OTHER PUBLICATIONS

Wu et al (Boron Removal from Silicon Using Secondary Refining Techniques by Metallurgical Method, Separation & Purification Reviews. vol. 49, (2020) pp. 66-88 published online on Oct. 1, 2018) (Year: 2018).*
Jia et al (Boron Removal From Metallurgical Grade Silicon Using a FeCl2 Molten Salt Refining Technique, J. Min. Metall. Sec. B-Metall: 49(3) B (2013) 257-261). (Year: 2013).*
Machine Translation of JP-2004010472-A (Year: 2023).*

* cited by examiner

*Primary Examiner* — Colin W. Slifka
*Assistant Examiner* — Michael Forrest
(74) *Attorney, Agent, or Firm* — Bayramoglu Law Offices LLC

(57) ABSTRACT

A method for removing phosphorus and boron impurities in an industrial silicon melt by secondary refining is provided. According to the present disclosure, inorganic zinc chloride is adopted as an impurity removal medium and is quickly decomposed into zinc and chloride ions at high temperatures; the phosphorus and boron impurities can react with the zinc and chloride ions to yield low-melting and high-melting compounds during contact with a silicon melt, the low-melting compounds volatilize and escape from the industrial silicon melt at the high temperature of the secondary refining. The high-melting compounds are segregated at the grain boundary along with silicon solidification and removed by crushing and pickling, or sink to the very bottom of the silicon melt and are removed by cutting off a deposition layer at a bottom of a silicon ingot after the silicon melt is solidified.

7 Claims, No Drawings

METHOD FOR REMOVING PHOSPHORUS AND BORON IMPURITY FROM INDUSTRIAL SILICON MELT BY SECONDARY REFINING

CROSS REFERENCE TO THE RELATED APPLICATIONS

This application is based upon and claims priority to Chinese Patent Application No. 202210463712.1, filed on Apr. 29, 2022, the entire contents of which are incorporated herein by reference.

TECHNICAL FIELD

The present disclosure belongs to the field of high-purity silicon production, and in particular, relates to a method for removing phosphorus and boron impurities in an industrial silicon melt by secondary refining.

BACKGROUND

As the most basic raw material for the electronic information industry and solar photovoltaic power generation industry, high-purity silicon is mainly used in integrated circuits, discrete devices, solar cells, and the like. High-purity silicon is usually purified from industrial silicon. The silicon content of industrial silicon generally ranges from 97% to 99%4. This grade of industrial silicon has low purity and limited application range, in which there are impurities of metals, boron, and phosphorus that are difficult to remove.

Metallurgical purification of silica is a novel silicon purification technology, which has the advantages of low investment, small floor space, fast plant construction, low energy consumption, low pollution, and low cost. In the process of metallurgical purification of silicon, silicon does not participate in chemical reactions, and impurity removal is realized by using the physical and chemical properties of impurities. With small segregation coefficients, metal elements can be removed from silicon by directional solidification. However, the segregation coefficients of phosphorus and boron in silicon are relatively large (0.8 and 0.35, respectively), so the conventional directional solidification process cannot be used. In response to this problem, Chinese Patent CN110228810A discloses a method for efficiently removing boron and phosphorus from silicon. The specific steps are as follows: mixing and smelting metallurgical-grade silicon, high-purity aluminum, and an element I to obtain a melt I; cooling the melt I to obtain a solidified alloy I; soaking the solidified alloy I in hydrochloric acid to obtain a primary crystal silicon wafer I, crushing the primary silicon wafer I into particles, immersing the particles in the hydrochloric acid, cleaning the particles with water and drying the particles to obtain silicon without boron impurity; mixing and smelting the silicon without the boron impurity, the high-purity aluminum and an element II to obtain a melt II; cooling the melt II to obtain a solidified alloy II; and soaking the solidified alloy II in the hydrochloric acid to obtain a primary silicon wafer II, crushing the primary silicon wafer II into particles, immersing the particles in the hydrochloric acid, cleaning the particles with the water and drying the particles to obtain silicon without phosphorus impurity. The method is simple in process, low in smelting temperature, low in energy consumption, the phosphorus content after treatment is less than 0.23 ppmw, and the boron content is less than 0.45 ppmw, with high industrial value. However, this method needs to add high-purity aluminum and high-purity hafnium first to remove boron impurities and then add one or two of high-purity aluminum, high-purity calcium, and high-purity magnesium to remove phosphorus impurities. The cost is significantly increased, because the divided impurity removal process is cumbersome, at least two metal elements are added for impurity removal, and the metal hafnium is expensive.

SUMMARY

To overcome the shortcomings of the prior art, the present disclosure aims to provide a method for removing phosphorus and boron impurities in an industrial silicon melt by secondary refining with a simple process, low cost, and no new impurities.

The objective of the present disclosure is achieved by the following technical solution: a method for removing phosphorus and boron impurities from an industrial silicon melt by secondary refining, including steps of: introducing a carrier gas to a ladle, vaporizing and adding zinc chloride to a silicon melt by means of the carrier gas, controlling a temperature of the silicon melt greater than or equal to 1,700° C., letting the silicon melt stand for a reaction for 30 min to 60 min after ventilation, and allowing low-melting compounds yielded by a reaction of chloride and zinc ions generated by decomposition of the zinc chloride with the phosphorus and boron impurities in the silicon melt to volatilize and escape; and cooling and solidifying the silicon melt, and removing high-melting compounds by means of crushing and pickling or cutting off a deposition layer at a bottom of a silicon ingot.

Further, a mass of the zinc chloride added is 1% to 5% of that of industrial silicon.

Further, the carrier gas is compressed argon.

Further, the carrier gas is introduced at a pressure of 0.2 MPa to 0.3 MPa and a flow rate of 800 L/h to 1,200 L/h for 20 min to 60 min.

Further, the zinc chloride is vaporized and slowly and uniformly added to the silicon melt with the carrier gas.

Further, the temperature of the silicon melt is controlled at 1,700° C.

Further, the cooling is intended to cool the silicon melt to room temperature at a rate of 1 K/min to 5 K/min.

The present disclosure has the following advantages: According to the present disclosure, inorganic zinc chloride is used as an impurity removal medium for removing phosphorus and boron from industrial silicon melt by secondary refining. The zinc chloride has a melting point of 283° C. and a boiling point of 732° C., and is easy to vaporize but remains stable at high temperatures. The zinc chloride which is heated and vaporized enters the silicon melt under the action of a carrier gas. The carrier gas and the zinc chloride vapor will have a stirring effect on the silicon melt, which is conducive to the occurrence of a reaction. Meanwhile, the zinc chloride is rapidly decomposed at high temperatures into zinc and chloride ions. Because the solubility of silicon in zinc is very low, as well as the solubility of zinc in silicon, both of them are substantially incompatible with each other at room temperature. The phosphorus and boron impurities can react with the zinc and chloride ions to yield low-melting and high-melting compounds during contact with the silicon melt, the low-melting compounds volatilize and escape from the industrial silicon melt at a temperature of the secondary refining higher than 1,700° C. The high-melting compounds are segregated at the grain boundary along with silicon solidification and removed by crushing and pickling, or sink to the very bottom of the silicon melt and are removed by cutting off a deposition layer at a bottom of a silicon ingot after the silicon melt is solidified. Chloride ion gas generated by the decomposition will further have a stirring effect on the silicon melt, which is more conducive to the full occurrence of the reaction. The method provided by the present disclosure is easy to operate and low in energy consumption. Phosphorus and boron can be removed from silicon at a time only by adding the zinc chloride, and new impurities are not introduced. The zinc chloride, the added impurity removal medium, is widely sourced and low-cost. Silicon after the removal of phosphorus and boron meets the requirement of solar-grade silicon for impurity content.

DETAILED DESCRIPTION OF THE EMBODIMENTS

The present disclosure will be further described below in conjunction with examples, and the protection scope of the present disclosure is not limited to the following descriptions:

Example 1: A Method for Removing Phosphorus and Boron Impurities from an Industrial Silicon Melt by Secondary Refining Compressed argon as a carrier gas was introduced to a ladle at a pressure of 0.2 MPa and a flow rate of 800 L/h for 20 min. Zinc chloride was vaporized and added to a silicon melt by means of the carrier gas. The vaporized zinc chloride was slowly and uniformly added to the silicon melt along with the carrier gas. The mass of the zinc chloride added was 1% of that of industrial silicon. The temperature of the silicon melt was controlled at 1,700° C. The silicon melt was let stand for a reaction for 30 min after ventilation, and low-melting compounds yielded by a reaction of the zinc chloride with the phosphorus and boron impurities in the silicon melt volatilized and escaped; after the silicon melt was cooled and solidified, high-melting compounds were removed by means of crushing and pickling or cutting off a deposition layer at a bottom of a silicon ingot. The cooling was intended to cool the silicon melt to room temperature at a rate of 1 K/min.

Before impurity removal, the content of phosphorus in the silicon melt was 35 ppm, and that of boron was 25 ppm; after impurity removal, the content of phosphorus was 25 ppm, and that of boron was 20 ppm.

Example 2: A Method for Removing Phosphorus and Boron Impurities from an Industrial Silicon Melt by Secondary Refining Compressed argon as a carrier gas was introduced to a ladle at a pressure of 0.2 MPa and a flow rate of 800 L/h for 20 min. Zinc chloride was vaporized and added to a silicon melt by means of the carrier gas. The vaporized zinc chloride was slowly and uniformly added to the silicon melt along with the carrier gas. The mass of the zinc chloride added was 3% of that of industrial silicon. The temperature of the silicon melt was controlled at 1,700° C. The silicon melt was let stand for a reaction for 30 min after ventilation, and low-melting compounds yielded by a reaction of the zinc chloride with the phosphorus and boron impurities in the silicon melt volatilized and escaped; after the silicon melt was cooled and solidified, high-melting compounds were removed by means of crushing and pickling or cutting off a deposition layer at a bottom of a silicon ingot. The cooling was intended to cool the silicon melt to room temperature at a rate of 1 K/min.

Before impurity removal, the content of phosphorus in the silicon melt was 35 ppm, and that of boron was 25 ppm: after impurity removal, the content of phosphorus was 20 ppm, and that of boron was 15 ppm.

Example 3: A Method for Removing Phosphorus and Boron Impurities from an Industrial Silicon Melt by Secondary Refining Compressed argon as a carrier gas was introduced to a ladle at a pressure of 0.2 MPa and a flow rate of 800 L/h for 20 min. Zinc chloride was vaporized and added to a silicon melt by means of the carrier gas. The vaporized zinc chloride was slowly and uniformly added to the silicon melt along with the carrier gas. The mass of the zinc chloride added was 5% of that of industrial silicon. The temperature of the silicon melt was controlled at 1,700° C. The silicon melt was let stand for a reaction for 30 min after ventilation, and low-melting compounds yielded by a reaction of the zinc chloride with the phosphorus and boron impurities in the silicon melt volatilized and escaped; after the silicon melt was cooled and solidified, high-melting compounds were removed by means of crushing and pickling or cutting off a deposition layer at a bottom of a silicon ingot. The cooling was intended to cool the silicon melt to room temperature at a rate of 1 K/min.

Before impurity removal, the content of phosphorus in the silicon melt was 35 ppm, and that of boron was 25 ppm: after impurity removal, the content of phosphorus was 15 ppm, and that of boron was 10 ppm.

Example 4: A Method for Removing Phosphorus and Boron Impurities from an Industrial Silicon Melt by Secondary Refining Compressed argon as a carrier gas was introduced to a ladle at a pressure of 0.2 MPa and a flow rate of 800 L/h for 20 min. Zinc chloride was vaporized and added to a silicon melt by means of the carrier gas. The vaporized zinc chloride was quickly added to the silicon melt in a short time along with the carrier gas. The mass of the zinc chloride added was 5% of that of industrial silicon. The temperature of the silicon melt was controlled at 1,800° C. The silicon melt was let stand for a reaction for 30 min after ventilation, and low-melting compounds yielded by a reaction of the zinc chloride with the phosphorus and boron impurities in the silicon melt volatilized and escaped; after the silicon melt was cooled and solidified, high-melting compounds were removed by means of crushing and pickling or cutting off a deposition layer at a bottom of a silicon ingot. The cooling was intended to cool the silicon melt to room temperature at a rate of 1 K/min.

Before impurity removal, the content of phosphorus in the silicon melt was 35 ppm, and that of boron was 25 ppm; after impurity removal, the content of phosphorus was 10 ppm, and that of boron was 6 ppm.

Example 5: A Method for Removing Phosphorus and Boron Impurities from an Industrial Silicon Melt by Secondary Refining Compressed argon as a carrier gas was introduced to a ladle at a pressure of 0.2 MPa and a flow rate of 800 L/h for 40 min. Zinc chloride was vaporized and added to a silicon melt by means of the carrier gas. The vaporized zinc chloride was quickly added to the silicon melt in a short time along with the carrier gas. The mass of the zinc chloride added was 5% of that of industrial silicon. The temperature of the silicon melt was controlled at 1,800° C. The silicon melt was let stand for a reaction for 30 min after ventilation, and low-melting compounds yielded by a reaction of the zinc chloride with the phosphorus and boron impurities in the silicon melt volatilized and escaped; after the silicon melt was cooled and solidified, high-melting compounds were removed by means of crushing and pickling or cutting off a deposition layer at a bottom of a silicon ingot. The cooling was intended to cool the silicon melt to room temperature at a rate of 1 K/min.

Before impurity removal, the content of phosphorus in the silicon melt was 35 ppm, and that of boron was 25 ppm; after impurity removal, the content of phosphorus was 8 ppm, and that of boron was 5 ppm.

Example 6: A Method for Removing Phosphorus and Boron Impurities from an Industrial Silicon Melt by Secondary Refining Compressed argon as a carrier gas was introduced to a ladle at a pressure of 0.2 MPa and a flow rate of 800 L/h for 40 min. Zinc chloride was vaporized and added to a silicon melt by means of the carrier gas. The vaporized zinc chloride was slowly and uniformly added to the silicon melt along with the carrier gas. The mass of the zinc chloride added was 5% of that of industrial silicon. The temperature of the silicon melt was controlled at 1,800° C. The silicon melt was let stand for a reaction for 30 min after ventilation, and low-melting compounds yielded by a reaction of the zinc chloride with the phosphorus and boron impurities in the silicon melt volatilized and escaped; after the silicon melt was cooled and solidified, high-melting compounds were removed by means of crushing and pickling or cutting off a deposition layer at a bottom of a silicon ingot. The cooling was intended to cool the silicon melt to room temperature at a rate of 5 K/min.

Before impurity removal, the content of phosphorus in the silicon melt was 35 ppm, and that of boron was 25 ppm; after impurity removal, the content of phosphorus was 12 ppm, and that of boron was 6 ppm.

Example 7: A Method for Removing Phosphorus and Boron Impurities from an Industrial Silicon Melt by Secondary Refining Compressed argon as a carrier gas was introduced to a ladle at a pressure of 0.25 MPa and a flow rate of 800 L/h for 40 min. Zinc chloride was vaporized and added to a silicon melt by means of the carrier gas. The vaporized zinc chloride was slowly and uniformly added to the silicon melt along with the carrier gas. The mass of the zinc chloride added was 5% of that of industrial silicon. The temperature of the silicon melt was controlled at 1,800° C. The silicon melt was let stand for a reaction for 60 min after ventilation, and low-melting compounds yielded by a reaction of the zinc chloride with the phosphorus and boron impurities in the silicon melt volatilized and escaped; after the silicon melt was cooled and solidified, high-melting compounds were removed by means of crushing and pickling or cutting off a deposition layer at a bottom of a silicon ingot. The cooling was intended to cool the silicon melt to room temperature at a rate of 5 K/min.

Before impurity removal, the content of phosphorus in the silicon melt was 35 ppm, and that of boron was 25 ppm; after impurity removal, the content of phosphorus was 9 ppm, and that of boron was 5 ppm.

Example 8: A Method for Removing Phosphorus and Boron Impurities from an Industrial Silicon Melt by Secondary Refining Compressed argon as a carrier gas was introduced to a ladle at a pressure of 0.2 MPa and a flow rate of 1,000 L/h for 40 min. Zinc chloride was vaporized and added to a silicon melt by means of the carrier gas. The vaporized zinc chloride was slowly and uniformly added to the silicon melt along with the carrier gas. The mass of the zinc chloride added was 5% of that of industrial silicon. The temperature of the silicon melt was controlled at 1,800° C. The silicon melt was let stand for a reaction for 60 min after ventilation, and low-melting compounds yielded by a reaction of the zinc chloride with the phosphorus and boron impurities in the silicon melt volatilized and escaped; after the silicon melt was cooled and solidified, high-melting compounds were removed by means of crushing and pickling or cutting off a deposition layer at a bottom of a silicon ingot. The cooling was intended to cool the silicon melt to room temperature at a rate of 1 K/min.

Before impurity removal, the content of phosphorus in the silicon melt was 35 ppm, and that of boron was 25 ppm; after impurity removal, the content of phosphorus was 5 ppm, and that of boron was 3 ppm.

Example 9: A Method for Removing Phosphorus and Boron Impurities from an Industrial Silicon Melt by Secondary Refining Compressed argon as a carrier gas was introduced to a ladle at a pressure of 0.3 MPa and a flow rate of 1,200 L/h for 40 min. Zinc chloride was vaporized and added to a silicon melt by means of the carrier gas. The vaporized zinc chloride was slowly and uniformly added to the silicon melt along with the carrier gas. The mass of the zinc chloride added was 5% of that of industrial silicon. The temperature of the silicon melt was controlled at 1,800° C. The silicon melt was let stand for a reaction for 45 min after ventilation, and low-melting compounds yielded by a reaction of the zinc chloride with the phosphorus and boron impurities in the silicon melt volatilized and escaped; after the silicon melt was cooled and solidified, high-melting compounds were removed by means of crushing and pickling or cutting off a deposition layer at a bottom of a silicon ingot. The cooling was intended to cool the silicon melt to room temperature at a rate of 3 K/min.

Before impurity removal, the content of phosphorus in the silicon melt was 35 ppm, and that of boron was 25 ppm; after impurity removal, the content of phosphorus was 7 ppm, and that of boron was 5 ppm.

COMPARATIVE EXAMPLE

Compressed argon as a carrier gas was introduced to a ladle at a pressure of 0.25 MPa and a flow rate of 1,000 L/h for 20 min. The silicon melt was let stand for a reaction for 30 min after ventilation. No zinc chloride was added to the ladle.

Before impurity removal, the content of phosphorus in the silicon melt was 35 ppm, and that of boron was 25 ppm; after impurity removal, the content of phosphorus was 33 ppm, and that of boron was 24 ppm.

The above description is only preferred embodiments of the present disclosure, but the protection scope of the present disclosure is not limited thereto. Any equivalent substitution or alteration made within a technical scope of the present disclosure by a person skilled in the art according to the technical solution of the present disclosure and inventive concepts thereof shall fall within the protection scope of the present disclosure.

What is claimed is:

1. A method for removing phosphorus and boron impurities from an industrial silicon melt by a secondary refining, comprising steps of: introducing a carrier gas to a ladle, and vaporizing and adding zinc chloride to the industrial silicon melt by means of the carrier gas, wherein the zinc chloride is slowly and uniformly added to the industrial silicon melt with the carrier gas after the vaporizing and a temperature of the industrial silicon melt is controlled to be greater than or equal to 1,700° C., letting the industrial silicon melt stand for a reaction for 30 min to 60 min, and allowing low-melting compounds yielded by a reaction of chloride and zinc ions generated by a decomposition of the zinc chloride with the phosphorus and boron impurities in the industrial silicon melt to volatilize and escape; and cooling and solidifying the industrial silicon melt, and removing high-melting compounds by means of crushing and pickling or cutting off a deposition layer at a bottom of a silicon ingot.

2. The method for removing the phosphorus and boron impurities from the industrial silicon melt by the secondary refining according to claim 1, wherein a mass of the zinc chloride added is 1% to 5% of a mass of the industrial silicon melt.

3. The method for removing the phosphorus and boron impurities from the industrial silicon melt by the secondary refining according to claim 1, wherein the carrier gas is a compressed argon.

4. The method for removing the phosphorus and boron impurities from the industrial silicon melt by the secondary refining according to claim 1, wherein the carrier gas is introduced at a pressure of 0.2 MPa to 0.3 MPa and a flow rate of 800 L/h to 1,200 L/h for 20 min to 60 min.

5. The method for removing the phosphorus and boron impurities from the industrial silicon melt by the secondary refining according to claim 1, wherein the temperature of the industrial silicon melt is controlled at 1,700° C.

6. The method for removing the phosphorus and boron impurities from the industrial silicon melt by the secondary refining according to claim 1, wherein the cooling is intended to cool the industrial silicon melt to room temperature at a rate of 1 K/min to 5 K/min.

7. The method for removing the phosphorus and boron impurities from the industrial silicon melt by the secondary refining according to claim 3, wherein the carrier gas is introduced at a pressure of 0.2 MPa to 0.3 MPa and a flow rate of 800 L/h to 1,200 L/h for 20 min to 60 min.

* * * * *